United States Patent Office 2,770,779
Patented Nov. 13, 1956

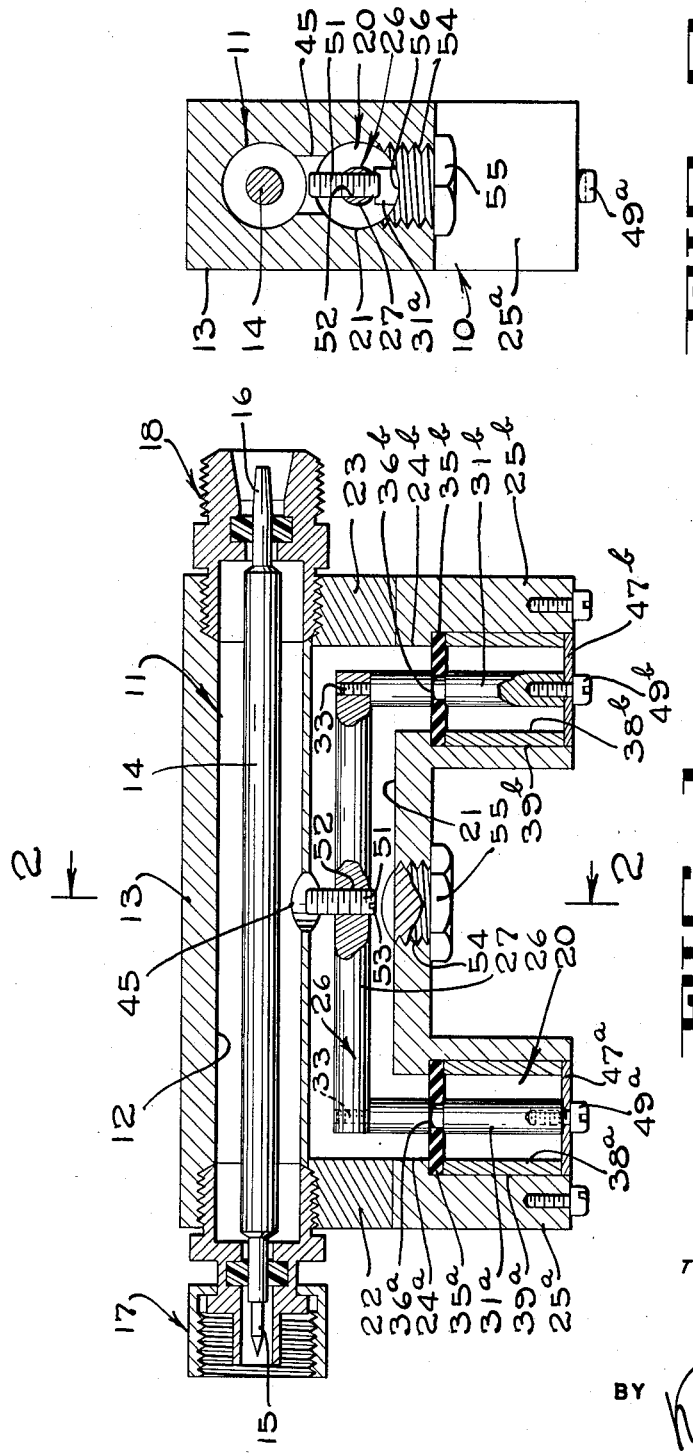

2,770,779

DIRECTIONAL COUPLER

Thomas F. Turner, San Jose, Calif., assignor, by mesne assignments, to Sierra Electronic Corporation, San Carlos, Calif., a corporation of California Application February 8, 1951, Serial No. 209,931

2 Claims. (Cl. 333—10)

The present invention relates to directional couplers. Couplers of this type are usually composed of adjacently positioned primary and secondary coaxial line sections of the kind wherein one of the conductors is of tubular cross section and concentrically surrounds the other, with the center conductors of said lines exposed to each other through one or more common holes in said outer tubular conductors. Owing to the geometrical configuration of the coupling established between the two line sections through such holes a voltage proportional to a reflected wave in the primary line section may be made to appear across a matched impedance at one end of the secondary line section, while a voltage proportional to the incident wave traveling in the primary line section will at the same time appear across a matched impedance at the other end of the secondary line section. Directional couplers are employed to measure the behavior of transmission lines into which they are inserted, and since this behavior indicates completely the nature of the load impedance connected to the primary line, they may also be employed to measure impedances directly.

The ability of directional couplers to distinguish between incident and reflected wave is termed the directivity of the coupler and may be established in different ways. Thus, directional couplers employing several coupling holes operate on the principle that the incident wave in the primary line section induces in the secondary line section through a first coupling hole a wave that would normally travel in both directions on said secondary line section. However, an additional wave is induced in the secondary line section through a second coupling hole that is spaced an odd number of quarter waves down the primary line. Owing to the phase shift of said additional wave as effected by the defined position of said second coupling hole, the component of the initially induced wave which travels in opposite direction to the incident wave in the primary line is cancelled while the component of the initially induced wave traveling in the direction of the incident wave is increased by the co-directional component of the wave induced through the second coupling hole. This means in effect that the wave induced into the second line section by the incident wave in the primary line section can travel only in the direction of the incident wave in the primary line section. Analogically, the same coupling holes provide that the wave induced into the secondary line section by the reflected wave in the primary line section can travel only in the direction of the reflected wave in the primary line section.

The practical utility of multi-hole couplers of the type briefly described above is evidently limited by the fact that they operate effectively only at the frequency corresponding to the wave length established by the distance between the coupling holes; in other words, to operate at other frequencies the distance between the coupling holes would have to be varied to equal a quarter of the new wave length.

This limitation of multi-hole couplers is overcome by couplers that have only a single coupling hole. Such couplers make use of the fact that the electrostatic coupling between the two line sections through a single hole is symmetrical while the electromagnetic coupling between said lines is anti-symmetrical. Thus, the electrostatic field established by the incident wave in the primary line section produces in the secondary line section two voltage waves of equal magnitude traveling in opposite directions, while the electromagnetic field established by said incident wave in the primary line section produces in the secondary line section a current wave traveling only in the direction opposite to the incident wave in the primary line section. Taking advantage of the fact that the electromagnetic coupling between two conductors varies in proportion to the cosine of the angle between the coupled conductors while the electrostatic coupling remains constant as the angle between the conductors is varied, it has been the practice to reduce the electromagnetic coupling between the line sections to equal the electrostatic coupling by varying the angle between the said line sections.

When said angle is adjusted to establish this equality, the uni-directional wave produced in the secondary line by the magnetic field is equal in magnitude to either of the two wave components produced in the secondary line by the electrostatic field. As a result thereof cancellation occurs between the electromagnetically induced wave and the electrostatically induced wave component traveling in opposite direction, while the residual component of the electrostatically induced wave, which travels in the direction of the incident wave in the primary line section, will appear as a voltage that can be measured across an impedance provided at the respective end of the secondary line section, and if said impedance is the characteristic impedance of the respective half of the secondary line section, said voltage gives a direct indication of the magnitude of the incident wave. Analogically, owing to the geometric and electrical symmetry of the coupled line sections, a reflected wave in the primary line section will produce across a characteristic terminal impedance at the opposite end of the secondary line section a voltage that gives a direct indication of the magnitude of the reflected wave in the primary line section. It can also be shown that in single hole couplers of the type described the phase relation between the incident and reflected waves in the primary line section is preserved between the voltages appearing at the opposite ends of the secondary line section in the manner described above.

While single-hole couplers exhibit practically perfect directivity over a wide band of frequencies, this is true only if the coupling hole is extremely small as compared with an eighth of the wave length. Unfortunately with a coupling hole of such smallness the coupling established between the line sections is too weak for many of the conventional applications of the coupler and yields output voltages that are extremely difficult to measure; in other words, the sensitivity of the coupler is low. On the other hand, if the hole is made larger to provide stronger coupling, the directivity of the device is no longer nearly perfect and becomes increasingly frequency dependent. Attempts have been made to correct the errors in the intended operation of the coupler that result from large coupling holes. Thus, shunt capacities have been introduced into the primary and secondary line sections near the coupling hole, but such measures complicate the device and prove effective only over a limited frequency range.

It is an object of the present invention to provide a directional coupler of practically perfect directivity.

Another object of the invention is to provide a directional coupler that retains practically perfect directivity over a wide band of frequencies.

It is yet another object of the invention to provide a directional coupler that combines high sensitivity with practically perfect directivity over a wide band of frequencies.

More specifically it is an object of the invention to provide a directional coupler which employs a single coupling hole of small diameter, and yet is highly sensitive.

An additional object of the invention is to increase the sensitivity of a single-hole directional coupler without increasing the size of its coupling hole.

A further object of the invention is to increase the sensitivity of a single-hole directional coupler without introducing error-producing discontinuities into the primary line section.

Still another object of the invention is to provide a single-hole directional coupler that may readily be adjusted without need to change the relative position of its line sections. In this connection it is another object of the invention to provide a directional coupler of extreme compactness which needs no additional space for adjustment.

These and other objects of my invention will be apparent from the following description of the accompanying drawings which illustrate a preferred embodiment thereof and wherein:

Fig. 1 is a longitudinal section through a directional coupler embodying the invention; and Fig. 2 is a central cross section through said coupler taken along line 2—2 of Fig. 1 and viewed in the direction of the arrows associated with said line.

In accordance with the invention I provide in single-hole directional couplers, of the type described, means for increasing the capacitance between the center conductors of the two line sections in the region of the coupling hole. By virtue of such means I am able to adjust the coupler without reducing the magnetic coupling between the lines, by increasing the capacitive coupling therebetween until it matches the magnetic coupling. As a result thereof I obtain high sensitivity without increase in the size of the coupling hole so that the frequency-independent directivity of the device is fully retained.

In the exemplary embodiment of the invention illustrated in the accompanying drawings, the total device is encompassed within a block 10 of a suitable metal, such as duraluminum or brass. Said block has preferably the shape of an inverted U and the primary line section 11 of the device is formed by a cylindrical bore 12 extending longitudinally through the horizontal bar 13 of the block 10 along the upper end thereof. Within said bore is concentrically disposed the center conductor 14 of the primary line section, which may be formed by a silver plated brass rod. The opposite ends of said center conductor 14 are formed into male and female contact members 15 and 16, respectively, that extend through and rest in suitable connector fittings 17 and 18 which are screwed into the ends of the bore 12 as shown in Fig. 1. The secondary line section 20 is of U-shaped conformation and its horizontal run is formed by another cylindrical bore 21 extending longitudinally through the horizontal bar 13 of the block 10 parallel to and directly below the bore 12, with its ends closed off by plugs 22 and 23 of a suitable metal, such as brass. The vertical runs of said secondary line are formed by two cylindrical bores 24a and 24b extending from the free ends of the vertical legs 25a and 25b of the block 10 upwardly into communication with the horizontal bore 21. Concentrically disposed within the resultant passage in the shape of an inverted U is the center conductor 26 of the secondary line. Said center conductor may be assembled from a horizontal rod 27 of silver plated brass that extends concentrically through the bore 21 and the ends of which are secured to the upper ends of the two vertically disposed silver plated brass rods 31a and 31b in any suitable manner, such as by means of threaded tenons 33 that engage correspondingly threaded holes in the ends of the horizontal rod 27, as shown in Figure 1. To support the composite conductor structure 26 described above in properly centered position within the passage 21—24a—24b supporting washers 35a and 35b of a dielectric material are mounted within the walls of the vertical bores 24a and 24b and may be arranged to engage with their inner edges annular grooves 36a and 36b provided in the vertical rods 31a and 31b, respectively. Said washers may rest upon the upper ends of silver plated brass tubes 38a and 38b that are fitted within the radially expanded end portions 39a and 39b of the vertical bores 24a and 24b as clearly shown in Fig. 1. For minimum effect upon the operation of the coupler, said washers 35a and 35b should be made of a low loss dielectric material of a low dielectric constant, such as polystyrene or teflon, and any discontinuity introduced into the secondary line section by the dielectric characteristics of said washers may be conveniently compensated for by appropriately dimensioning the radial depth of the grooves 36a and 36b in the rods 31a and 31b and the radial depth of the recess in the walls within which said washers rest.

The described primary and secondary line sections are coupled through a circular hole 45 drilled concentrically with the symmetric axis of the described device in the partition between the upper horizontal bore 12 and the lower horizontal bore 21. To obtain a device of practically perfect directivity over a wide band of frequencies, said coupling hole should be small in diameter and of minimum depth. In the device of the invention said hole is preferably smaller in diameter than the bores 12 and 21 as clearly shown in Figure 2, and to keep the depth of the hole at a minimum the two horizontal bores should be placed as closely together as the nature of the material from which the block 10 is made, will permit.

To measure voltages developed at the ends of the secondary line section during practical application of the described coupler, said ends are closed through resistors 47a and 47b, respectively, that have the form of disks and may be made of carbon with silver plated contact areas. Said disks may be secured to the ends of the center conductors 31a and 31b in any suitable manner, such as by means of center screws 49a and 49b and they contact with their peripheral regions the lower ends of the brass tubes 38a and 38b, respectively. To avoid generation of reflected waves which would interfere with the proper operation of the coupler, said resistors must be carefully matched to the characteristic impedances of the respective halves of the secondary line section.

To adjust the described coupler without loss of sensitivity I provide means operable to increase the capacitive coupling between the center conductors 14 and 27 that are exposed to one another through the hole 45. In the embodiment illustrated in the accompanying drawing said means takes the form of a silver plated screw 51 of brass that is disposed coaxially with the coupling hole 45 and which may be mounted in a correspondingly threaded perforation 52 that extends diametrically through the lower center conductor 27. By turning said screw in such a manner that it moves closer to the center conductor of the primary line, the capacitive coupling between said lines may readily be increased until it matches the magnetic coupling established between the two lines through the coupling hole 45. For convenient operation the lower end of said screw 51 may be slotted, as shown at 53, and to provide access to said screw for the purpose of adjustment a large aperture 54 may be arranged in the block 10 at a point diametrically opposite to the coupling hole 45 and in coaxial alignment with the screw 51. During operation said aperture 54 is closed by a headed cap screw 55, the free inner end of which should be made concave, as shown at 56, to conform with the wall of the bore 21, and thus avoid any discontinuity in the line.

The described device has the practically perfect frequency-independent directivity of the ordinary single-hole coupler of small coupling-hole diameter, yet it is of as great a sensitivity as was previously only attainable in large-hole couplers at a great sacrifice in the frequency independence of the directivity. It is of a far simpler construction than the previously known single-hole couplers since it requires no mechanism for rotating the line sections relative to one another. Also it requires less space than the previously known single-hole couplers since its line sections may remain in parallel relation and may in fact be formed as integral parts of a rigid structure as illustrated in the accompanying drawings. It may be adjusted with the greatest of ease with no other manipulation than the turning of a suitable screw driver.

While I have explained my invention with the aid of a particular embodiment thereof, it will be understood that I do not wish to be limited to the specific constructional details shown and described. Thus, while I have shown the outer conductors of the coaxial line sections as formed by parallel bores provided in a common metallic block, it will be understood that they may just as well be formed in the conventional manner by a pair of metal tubes, without departing from the scope and spirit of the invention. Also, while I have shown the two line sections combined in a rigid structure without provision for changing the relative angular position of said line sections, it will be understood that the principles of my invention may be employed to advantage in couplers arranged in the conventional manner to permit adjustment of the electromagnetic coupling. Furthermore, while the preferred embodiment of the invention illustrated in the accompanying drawings employs a metallic member for varying the capacity between the center conductors of the two line sections, other means such as an adjustable element made from an insulating material of a high dielectric constant may be provided in the spirit of my invention to effect the required increase in the capacitive coupling between the line sections.

I claim:

1. In a directional coupler of the character described, a first transmission line section having straight coaxial center and outer conductors and adapted to conduct high frequency over a substantial frequency range, a second transmission line section disposed alongside the first section and having straight coaxial center and tubular conductors parallel to the first named conductors, the tubular conductors of the two sections having a common conducting wall located intermediate the center conductors, said common wall having a single coupling opening therethrough whereby the transmission line sections are coupled together with magnetic and capacitive components, said opening being of a size which is small compared with ⅛ the wavelength of frequency in said range and having its central axis at right angles to the center conductors, the length of the opening in the direction of the conductors being not greater than its width, and a cylindrical shaped coupling member formed of conducting material extending in alignment with said axis, said coupling member being adjustably mounted on one of the center conductors for adjustment axially of said opening to advance or retract to one end thereof with respect to the other center conductor, said coupling member being dimensioned whereby when it is advanced to a position within the opening a free space is provided between the same and the periphery of said opening through which the transmission lines are magnetically coupled, adjustment of said coupling member serving to adjust the capacitative component of the coupling between the transmission line sections.

2. A directional coupler as in claim 1 in which the coupling member is in the form of a metal screw which has adjustable threaded engagement with the center conductor of the second transmission line section.

References Cited in the file of this patent

UNITED STATES PATENTS

| | | |
|---|---|---|
| 2,395,870 | Hiehle | Mar. 5, 1946 |
| 2,459,197 | Stewart | Jan. 18, 1949 |
| 2,475,464 | Shankweiler | July 5, 1949 |
| 2,486,818 | Bowman | Nov. 1, 1949 |
| 2,519,734 | Bethe | Aug. 22, 1950 |
| 2,523,254 | Talpey | Sept. 19, 1950 |
| 2,562,281 | Mumford | July 31, 1951 |
| 2,606,974 | Wheeler | Aug. 12, 1952 |
| 2,657,361 | Henning | Oct. 27, 1953 |